(12) United States Patent
Lavalette et al.

(10) Patent No.: US 11,268,593 B2
(45) Date of Patent: Mar. 8, 2022

(54) AIRBOAT TRANSMISSION FOR DRIVING COUNTER-ROTATING PROPELLERS

(71) Applicant: Shane Lavalette, Lawrence, KS (US)

(72) Inventors: Shane Lavalette, Lawrence, KS (US); Steve Rutherford Walton, Olathe, KS (US)

(*) Notice: Subject to any disclaimer, the term of this patent is extended or adjusted under 35 U.S.C. 154(b) by 214 days.

(21) Appl. No.: 16/401,103

(22) Filed: May 1, 2019

(65) Prior Publication Data

US 2019/0338833 A1    Nov. 7, 2019

Related U.S. Application Data

(60) Provisional application No. 62/665,422, filed on May 1, 2018.

(51) Int. Cl.
| | |
|---|---|
| *F16H 1/22* | (2006.01) |
| *B63H 23/06* | (2006.01) |
| *F16H 57/021* | (2012.01) |
| *F16C 19/18* | (2006.01) |
| *B63H 7/02* | (2006.01) |

(52) U.S. Cl.
CPC ............... *F16H 1/22* (2013.01); *B63H 23/06* (2013.01); *F16C 19/181* (2013.01); *F16H 57/021* (2013.01); *B63H 7/02* (2013.01); *B63H 2023/067* (2013.01); *F16C 2326/06* (2013.01)

(58) Field of Classification Search
CPC ........................... B63H 2023/067; F16H 1/22
See application file for complete search history.

(56) References Cited

U.S. PATENT DOCUMENTS

| | | | | |
|---|---|---|---|---|
| 2,216,013 A | * | 9/1940 | Kenney | F16H 1/22 416/43 |
| 2,347,906 A | * | 5/1944 | Hatcher | F16H 1/22 74/665 K |
| 4,232,914 A | * | 11/1980 | Bowen, III | F16C 19/386 384/567 |
| 5,724,867 A | * | 3/1998 | Jordan | F16H 1/22 74/665 K |
| 6,299,495 B1 | * | 10/2001 | Jordan | B63H 5/10 416/129 |

* cited by examiner

*Primary Examiner* — Terence Boes
(74) *Attorney, Agent, or Firm* — Rimôn, P.C.

(57) ABSTRACT

The present innovation relates generally to propulsion mechanisms for propeller-driven vehicles and vessels, and, more particularly, to gear-driven transmissions for airboats.

8 Claims, 19 Drawing Sheets

AIRBOAT TRANSMISSION FOR DRIVING COUNTER-ROTATING PROPELLERS

CROSS-REFERENCE TO RELATED APPLICATIONS

This application claims priority to U.S. Provisional Patent Application No. 62/665,422, filed May 1, 2018, the contents of each of which is hereby incorporated by reference in its entirety.

FIELD

The present innovation relates generally to propulsion mechanisms for propeller-driven vehicles and vessels, and, more particularly, to gear-driven transmissions for airboats.

BACKGROUND

Airboats are often driven over land and water at high speeds. Airboats typically employ engines operating at approximately 2500-3000 revolutions per minute (rpm) connected to direct-drive shafts, which rotate can rotate a single propeller. A single-propeller propulsion mechanism often produces a torque that tends to inhibit the ability of the boat to maintain a level attitude, a problem that can be overcome by incorporating a steering apparatus with the propulsion mechanism that further comprises a pair of rudders with trim tabs added to correct for the torque produced. However, trim tabs are not preferable because they decrease thrust and efficiency of the propulsion mechanism.

Another way to overcome the problem of the torque produced by a single-propeller propulsion mechanism is for an airboat system to utilize a pair of coaxially aligned counter-rotating propellers, wherein the counter rotation of one propeller generally counteracts the torque produced by the other propeller and yields a zero net angular force on the airboat. Airboats with counter-rotating propellers can include a variety of transmissions to drive the propellers, including belt-driven transmissions or gear-driven transmissions. However, belt-driven transmissions and currently known gear-driven transmissions have disadvantages when used with airboats.

Belt-driven transmissions have several disadvantages when used with airboats. One disadvantage of belt-driven systems is the inefficiency owed to power losses caused by belt friction, especially at higher rotational velocities, which may lead to belt breakage as a source of failure. Another disadvantage of belt-driven systems is the necessary steep gear ratio between the pinion gear and the driven gear of the gear system, which can reduce output thrust and must be overcome with significant changes to the structure and/or arrangement of the driven propellers. Yet another disadvantage of belt-driven systems is the size and weight of the transmission, which can drastically hinder the operation of an airboat, especially for airboats used for commercial and high-performance uses. Even yet another disadvantage of belt-driven systems is their inability to permit reduction of engine speed, since the shaft used to effect such a reduction would have to be too small to be practicable.

Currently known gear-driven transmissions also have several disadvantages when used with airboats. One disadvantage of currently known gear-driven transmissions is the necessary size of the transmission. In currently known gear-driven transmissions, the arrangement of internal gear systems and gear trains requires a significant axial offset between an input shaft and an output shaft, which affects load capacity, weight and performance of the counter-rotating propeller propulsion mechanism. Another disadvantage of currently known gear-driven systems is the weight of the transmission, which can hinder the operation of an airboat, especially for airboats used for commercial and high-performance applications. Yet another disadvantage of currently known gear-driven systems is the need to implement a lubrication or oil system to provide proper lubrication to supporting and/or floating bearings between the inner and outer driven shafts. Such lubrication or oil systems introduce additional elements into the gear-driven transmission assembly, and such additional elements often function as additional points of failure for the system and add additional weight to the transmission assembly. Even yet another disadvantage is the length of the driven hollow shafts. Currently known gear-driven transmission assemblies utilize long hollow driven shafts, and the extended length of such hollow driven shafts increases the effect of internal torsional forces over the length of the hollow shafts.

Accordingly, a need exists for an improved gear-driven transmission for use with airboats that has a reduced the size and weight and does not contain an oil and lubrication system for supporting and/or floating bearings, while, at the same time, does not negatively affect the performance or capabilities of the transmission.

SUMMARY

According to the present disclosure, a gear-driven transmission, with a transmission housing is provided characterized as often having a first driven gear coaxially affixed to an inner driven shaft; a second driven gear coaxially affixed to an outer driven shaft; and an assembly of multiple gears rotatably fitted within the transmission housing and mechanically coupled with an engine drive shaft for driving the inner driven shaft and the outer driven shaft in a counter-rotating fashion; wherein the outer driven shaft is mounted to the gear-driven transmission wherein the inner driven shaft is mounted within the outer driven shaft.

In often included embodiments, a gear-driven transmission is provided further having a floating fore bearing set rotatably and coaxially attached to the outer driven shaft; and a floating aft bearing set rotatably and coaxially attached to the outer driven shaft at a position aft of the floating fore bearing set. Often, the floating fore bearing set comprises ball bearings with a first width and the floating aft bearing set comprises ball bearings with a second width. Also, in often included embodiments, the first width is larger than the second width. In certain specific embodiment, the ratio of the first width to the second width is 1.48:1. In certain related embodiments, the ratio of the first width to the second width is between about 1.5:1 to 1.4:1. In certain other embodiments, the ratio of the first width to the second width is between about 1.7:1 to 1.2:1. In certain other embodiments, the ratio of the first width to the second width is between about 2:1 to 1:1.

These and other embodiments, features, and advantages will become apparent to those skilled in the art when taken with reference to the following more detailed description of various exemplary embodiments of the present disclosure in conjunction with the accompanying drawings.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION

Figure 1:
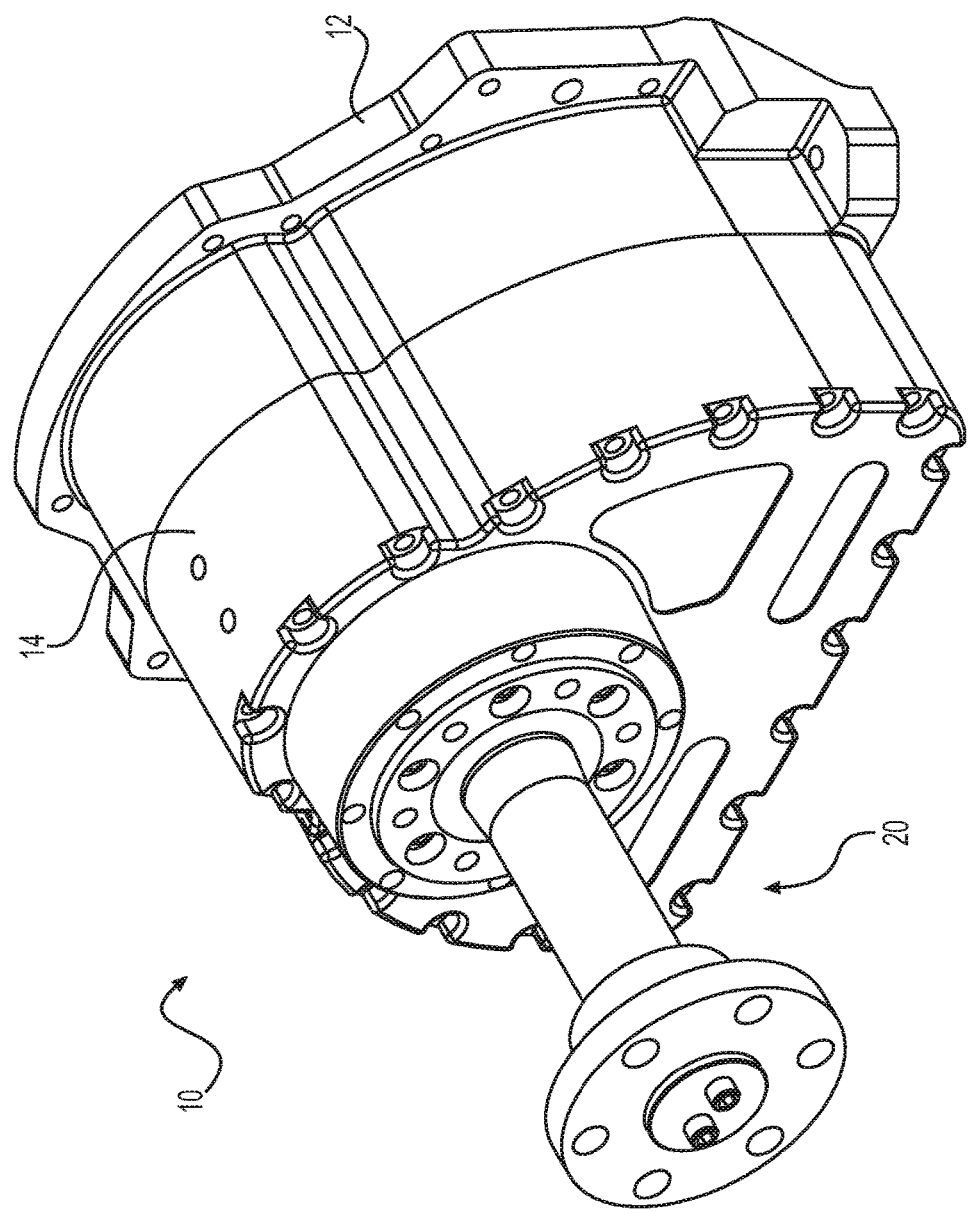
FIG. 1 is a perspective view of the aft side of an improved airboat transmission assembly in accordance with one embodiment of the present innovation.
Figure 2:
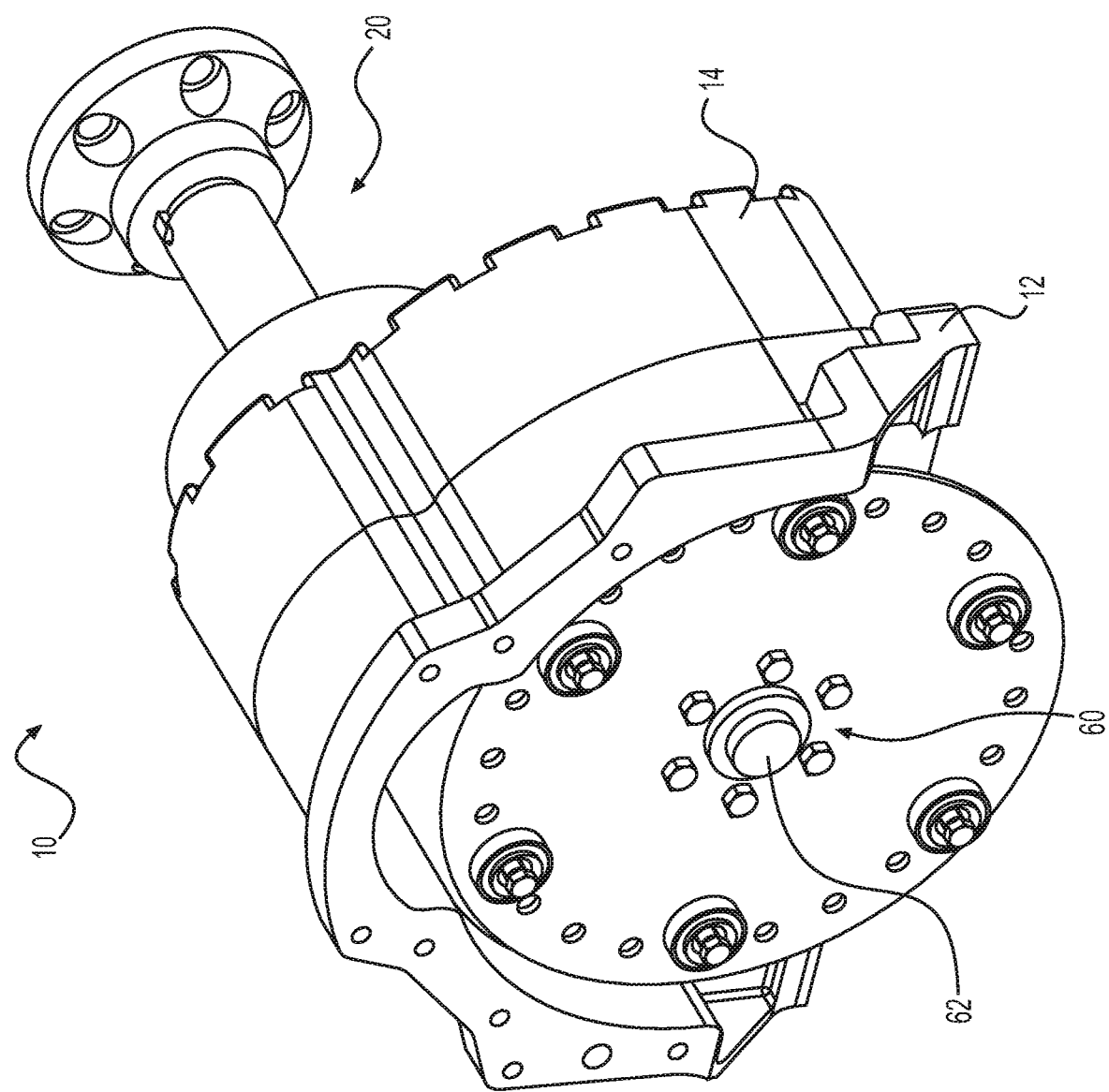
FIG. 2 is a perspective view of the fore side of an improved airboat transmission assembly in accordance with one embodiment of the present innovation.
Figure 3:
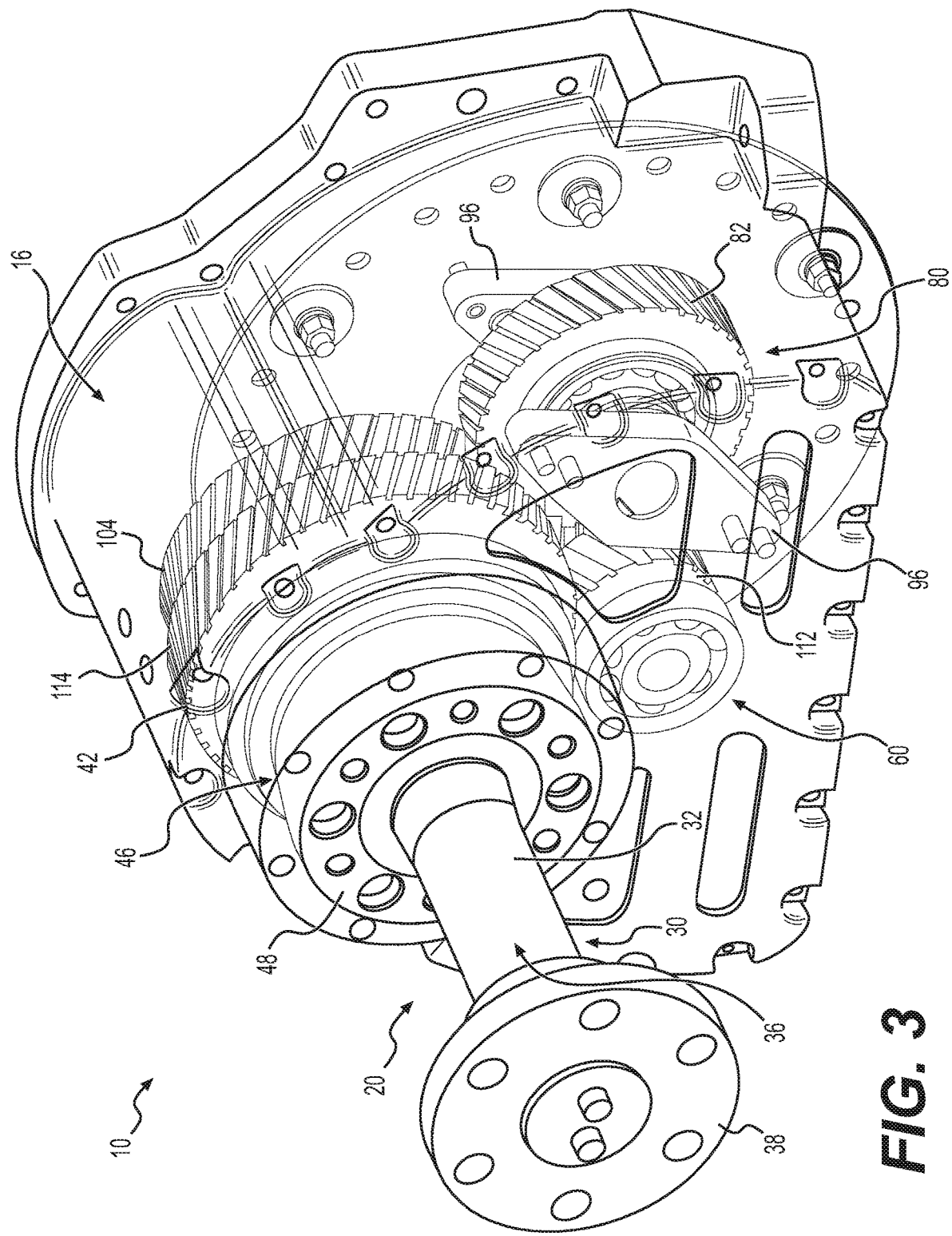
FIG. 3 is a perspective view of one end of an improved airboat transmission assembly, wherein in the transmission housing is depicted as transparent to illustrate the gear train assembly in accordance with one embodiment of the present innovation.

Unless defined otherwise, all technical and scientific terms used herein have the same meaning as is commonly understood by one of ordinary skill in the art to which this innovation belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

Other features and advantages of the innovation will be apparent from the following description and referenced drawings. The present innovations are often further described by examples. The examples are provided solely to illustrate the innovations by reference to specific embodiments. The drawings, which are not necessarily to scale, depict selected embodiments and are not intended to limit the scope of the present disclosure. These exemplifications, while illustrating certain specific aspects of the innovations, do not portray the limitations or circumscribe the scope of the disclosed innovations. The detailed description illustrates by way of example and is not intended to limit the scope of the present disclosure.

The description of the innovation references specific embodiments in which the innovation can be practiced. The embodiments are intended to describe aspects of the innovation in sufficient detail to enable those skilled in the art to practice the innovation. Other embodiments can be utilized and changes can be made without departing from the scope of the present innovation. The present innovation is defined by the appended claims and the description is, therefore, not to be taken in a limiting sense and shall not limit the scope of equivalents to which such claims are entitled.

One objective of the present innovation is to provide a lightweight, compact and self-contained gear-driven transmission assembly that is capable of driving coaxially aligned counter-rotating propellers at elevated horsepower loads and to provide improvement over the known art. One embodiment of the present innovation is designed to (a) reduce the axial offset between the input shaft and the output shaft of the transmission assembly, (b) reduce the weight of the gear-drive transmission assembly, and (c) eliminate the need for a dedicated oil or lubrication system for the bearings located between the counter-rotating hollow driven shafts.

The gear-driven transmission assembly 10 generally comprises a bellhousing 12, an outer case 14, a driven shaft assembly 20, an input shaft assembly 60, and an intermediate idler gear assembly 80. The bellhousing 12 is generally located on the fore side of the transmission assembly 10 and is affixable to an engine (not shown) by any number of fastening means. The outer case 14 is generally located on the aft side of the transmission assembly 10 and is also affixable to the bellhousing 12 also by any number of fastening means. In affixed combination of the bellhousing 12 and the outer case 14, the bellhousing 12 and outer case 14 define an interior space 16. It will be appreciated that the bellhousing 12 and the outer case 14 can be made from a variety of metals, including nonferrous metals, such as zinc, copper, and aluminum-based alloys, for casting or billet aluminum.

Figure 7:
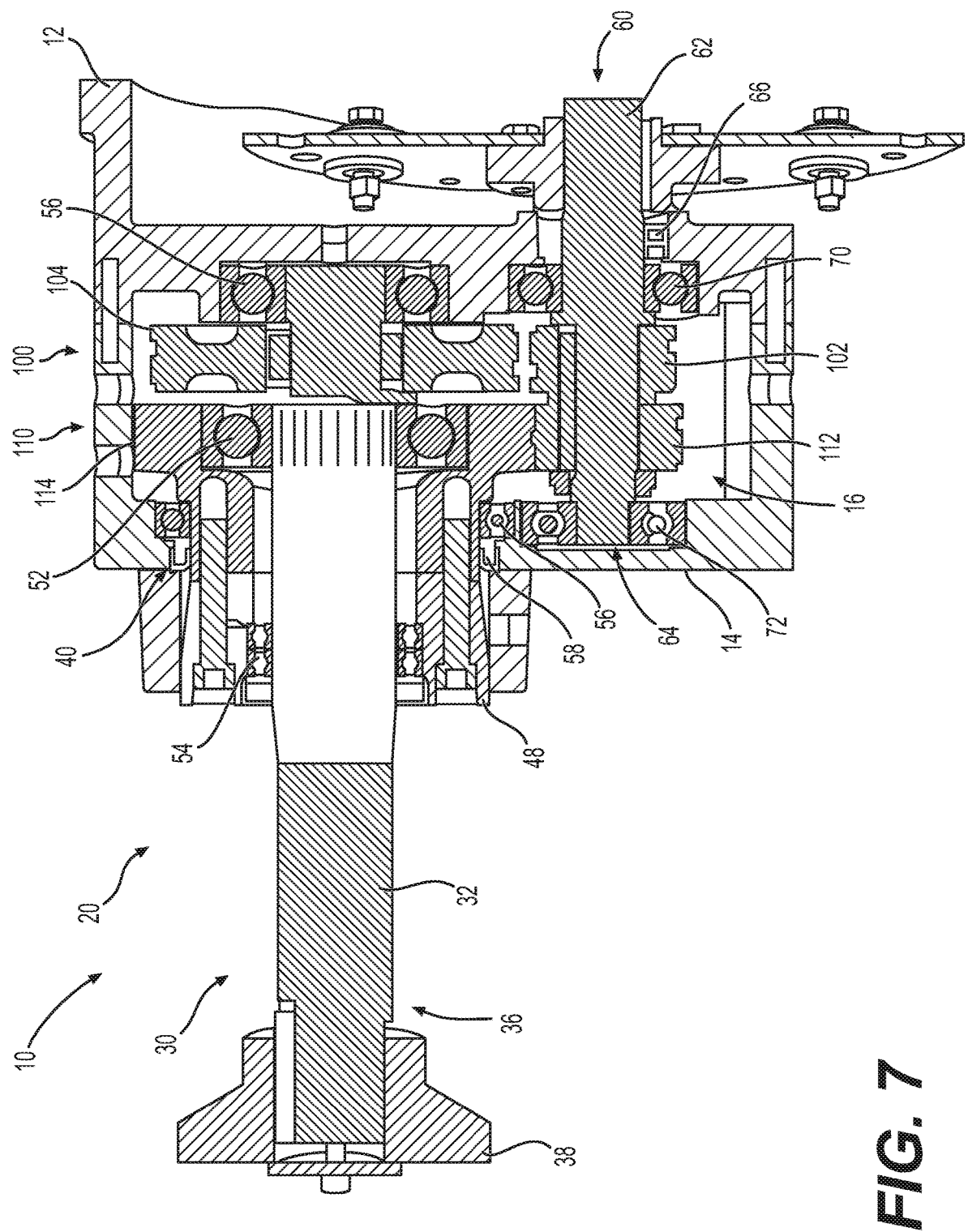
FIG. 7 is a sectional side view of an improved airboat transmission assembly in accordance with one embodiment of the present innovation.
Figure 8:
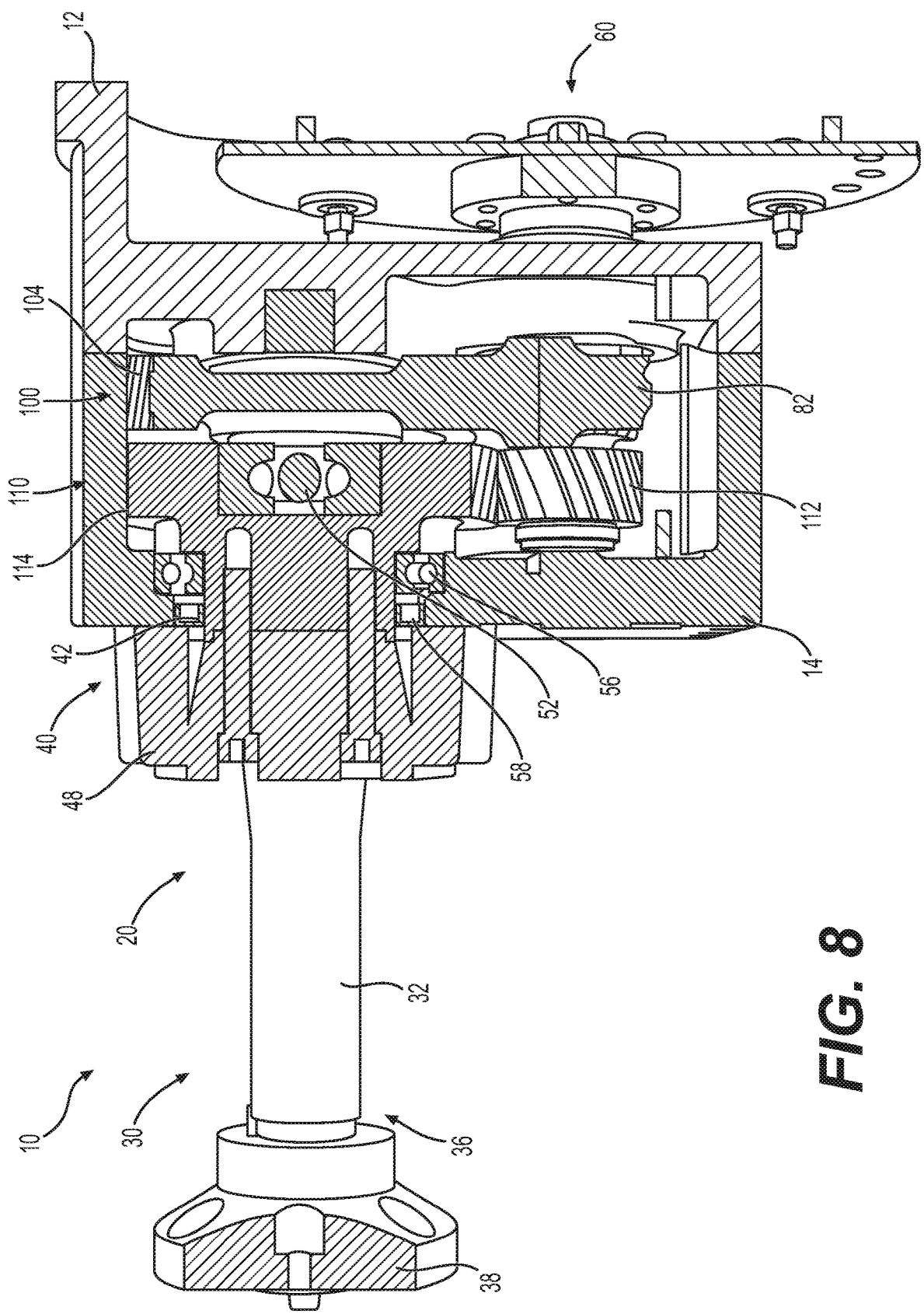
FIG. 8 is another sectional side view of an improved airboat transmission assembly in accordance with one embodiment of the present innovation.

As best illustrated in FIGS. 3-6, the driven shaft assembly 20 generally extends from the aft portion of the transmission assembly 10 through the outer case 14. The driven shaft assembly 20 generally comprises two shaft assemblies, an inner driven shaft assembly 30 and an outer driven shaft assembly 40, that extend from the interior space 16 of the transmission assembly 10. The inner driven shaft assembly 30 generally comprises an inner driven shaft 32 and an inner propeller drive hub 38, wherein the inner propeller drive hub 38 is affixable to the inner driven shaft 32 by any number of fastening means, for example, as best illustrated in FIG. 7, by a key-keyway connection between the inner driven shaft 32 and the inner propeller hub 38.

The outer driven shaft assembly 40 generally comprises an outer driven shaft 42 and an outer propeller drive hub 48, wherein the outer propeller drive hub 48 is affixable to the outer driven shaft 42 by any number of fastening means.

It will be appreciated, however, that any fastening means referenced herein for affixing one component to another component may include, but is not limited to, bolts, screws, pins, clamping members or any other suitable fastening means.

In one embodiment, the inner driven shaft assembly 30 extends further in the aft direction than the outer driven shaft assembly 40, and the outer driven shaft assembly 40 is positioned in a surrounding, generally coaxial arrangement to the inner driven shaft 32. Further, the length of the outer driven shaft 42 in the axial direction is generally shorter than the length of the inner driven shaft 32 in the axial direction, and the relative lengths of the inner driven shaft 32 and the outer driven shaft 42 permit a fore end 34 and an aft end 36 of the inner driven shaft 32 to protrude beyond a fore end 44 and an aft end 46 of the outer driven shaft assembly, respectively.

In a preferred embodiment, the inner driven shaft 32 is rotatably supportable via a series of coaxially aligned supporting means positioned in a spaced relation. These supporting means can include a fixed fore supporting means 50, a floating fore bearing set 52, and a floating aft bearing set 54. The fixed fore supporting means 50 can comprise a bearing set and bracket affixed to an aft portion of the bellhousing 12 in the interior space 16 of the transmission assembly 10. The inner driven shaft 32 is further supported and spaced from the outer driven shaft assembly 40 by the floating fore bearing set 52 and the floating aft bearings set 54, which are generally located at least partially fore of the aft-most portion of the outer case 14. Further, the configuration and arrangement of the floating fore bearing set 52 and the floating aft bearing set 54 eliminate the need for a dedicated lubrication or oil system (not shown) in the transmission assembly 10. It will be appreciated that the floating fore bearing set 52 and the floating aft bearing set 54 can comprise any configuration of bearings, including, but not limited to, cylindrical floating bearing sets.

In a preferred embodiment, the floating fore bearing set 52 has a large outer diameter, for example approximately 129.794 mm, and a significant width, for example approximately 30.988 mm. The ratio between the outer diameter of the floating fore bearing set 52 and the outer diameter of the floating aft bearing set 54 can be approximately 1.625:1.

Further, the ratio between the width of the floating fore bearing set 52 and the width of the floating aft bearing set 54 can be approximately 1.48:1. The increased size of the floating fore bearing set 52 creates several advantages over currently known gear-driven transmissions, namely that the increased size, especially in relation to the floating aft bearing set 54, provides greater axial stability for the driven shaft assembly 20, allows for compact construction of the transmission assembly 10, reduces the necessary volume and associated weight of the transmission assembly 10, provides an adequate seal between the inner driven shaft 32 and the outer driven shaft assembly 40 to eliminate the need for a lubricant or oil system dedicated to the floating bearing sets, and reduces the overall number of bearings sets, including fixed and floating bearing sets, necessary for the counter-rotating shaft assembly.

Further, as depicted in FIG. 7, the floating aft bearing set 54 can comprise a plurality of bearing sets, for example two bearing sets. Additionally, it will be appreciated that the floating aft bearing set 54 may comprise a tapered bearing set, which can provide added flexibility to inner driven shaft 32.

In one embodiment, the outer driven shaft assembly 40 is positioned in a surrounding, generally coaxial arrangement to the floating fore bearing set 52 and the floating aft bearing set 54. As best illustrated in FIG. 7, the outer driven shaft 42 is positioned in a surrounding, generally coaxial arrangement to the floating fore bearing set 52, wherein the floating fore bearing set 52 can be situated in a recess of the outer driven shaft 42, and the outer propeller drive hub 48 is positioned in a surrounding, generally coaxial arrangement to the floating aft bearing set 54. This arrangement of the floating fore bearing set 52 and the outer driven shaft 42 allows for a more compact configuration of the transmission assembly 10 and reduces the necessarily lengths of the inner drive shaft 32 and the outer driven shaft 42, which limits the effect of internal torsional forces over the length of each. For example, the inner driven shaft 32 can be on the order of about 425.45 mm long.

Figure 10:
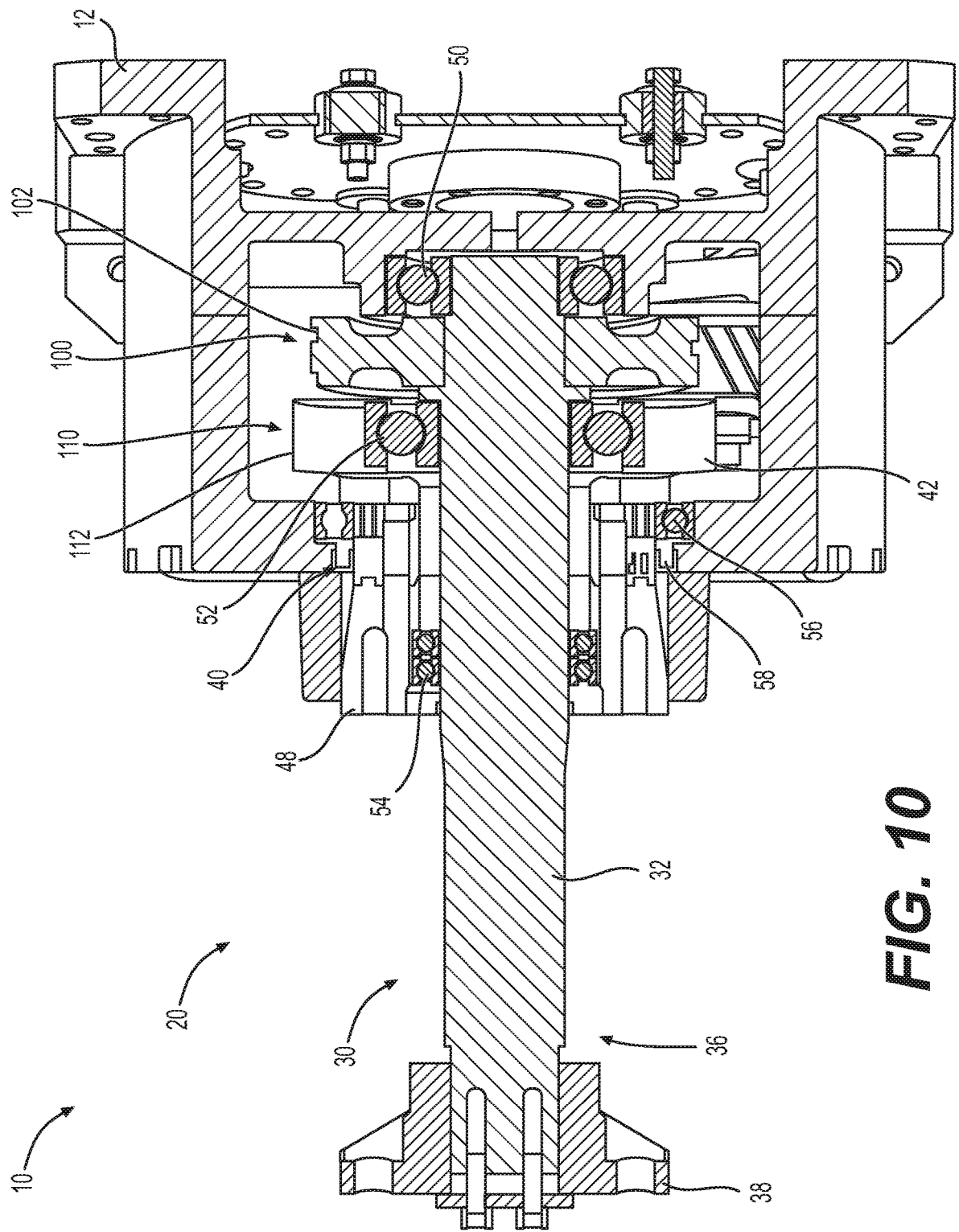
FIG. 10 is another sectional top view of an improved airboat transmission assembly in accordance with one embodiment of the present innovation.
Figure 11:
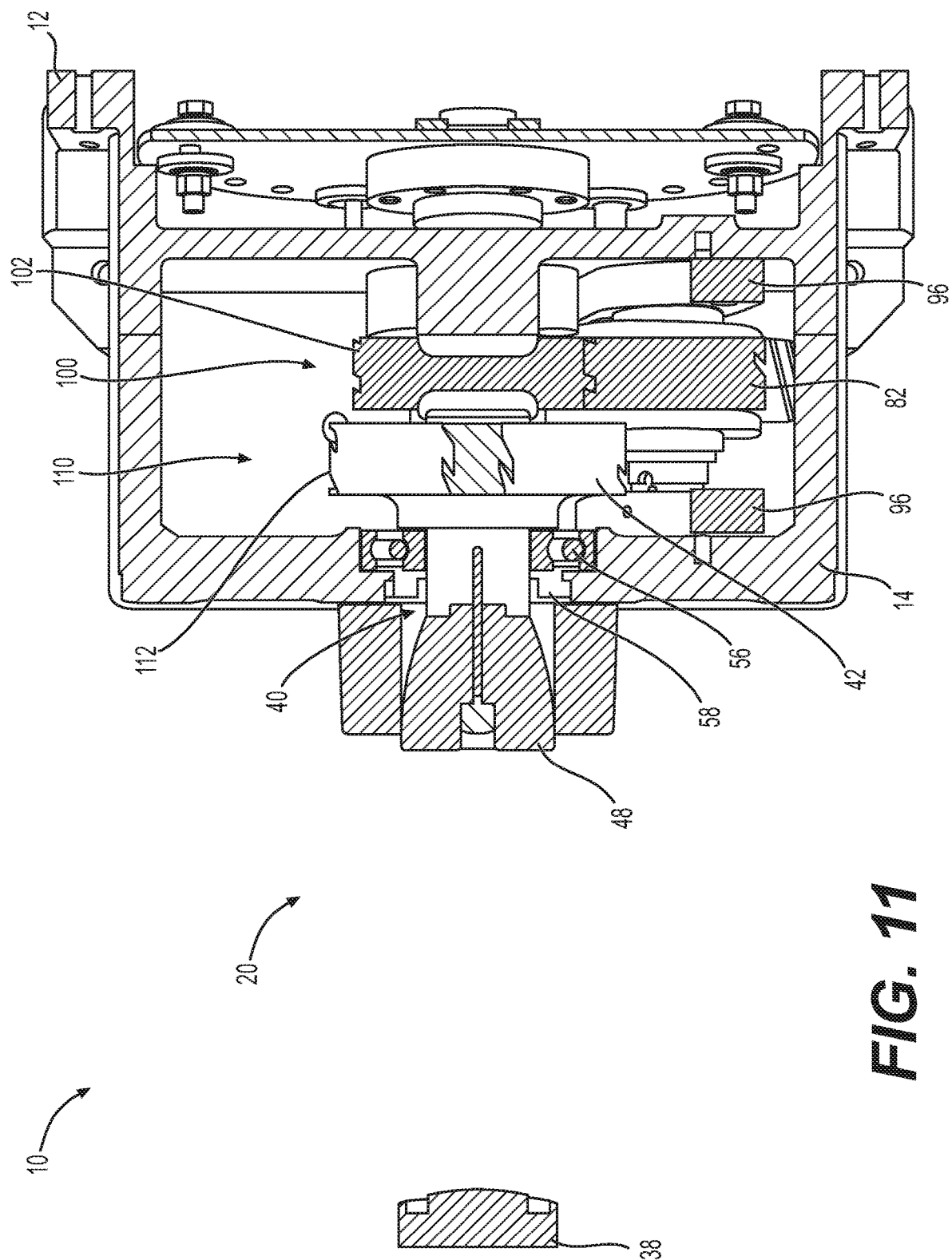
FIG. 11 is another sectional top view of an improved airboat transmission assembly in accordance with one embodiment of the present innovation.
Figure 12:
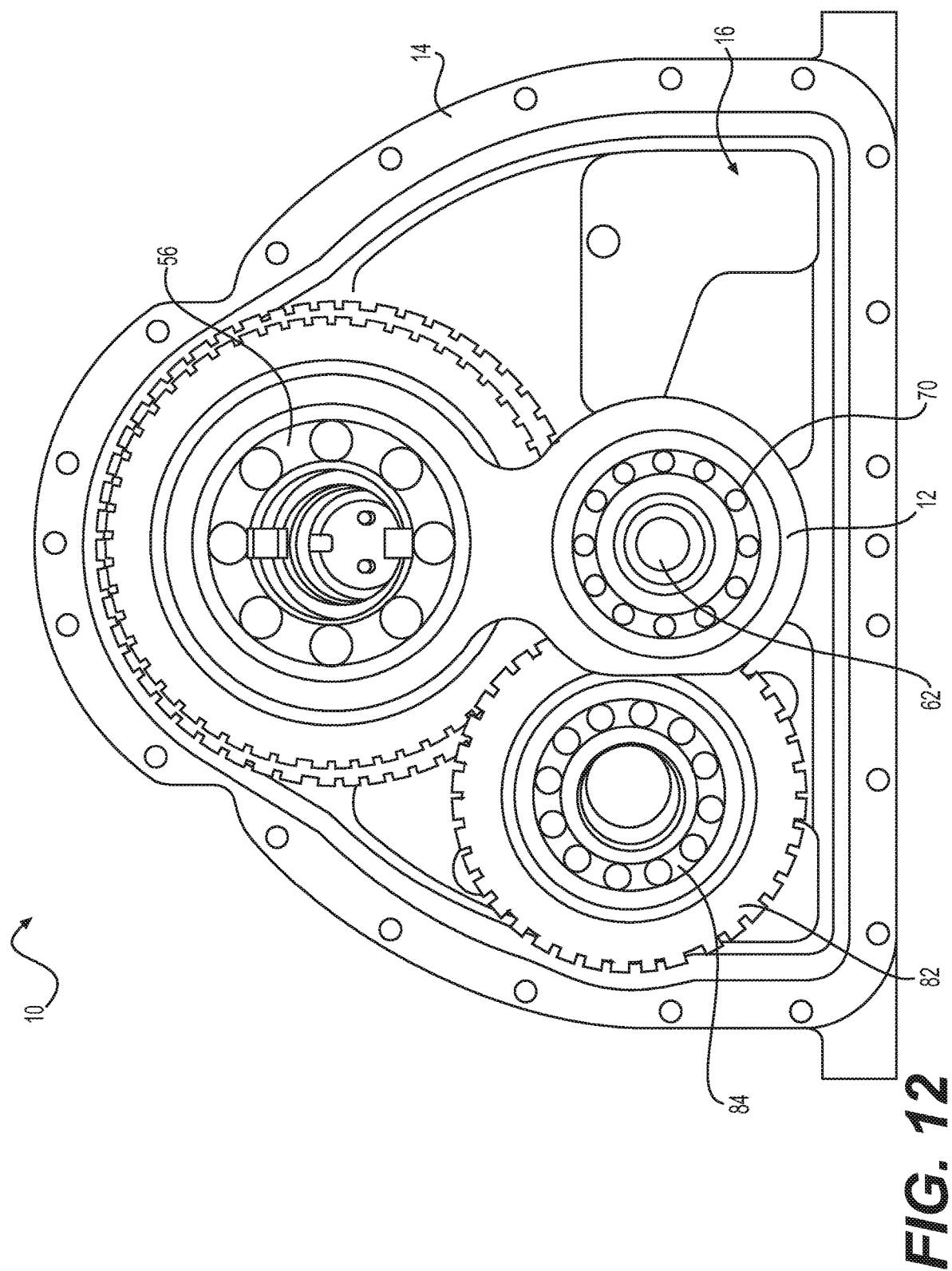
FIG. 12 is a sectional axial view of an improved airboat transmission assembly in accordance with one embodiment of the present innovation, illustrating a portion of the gear train assembly contained therein.
Figure 13:
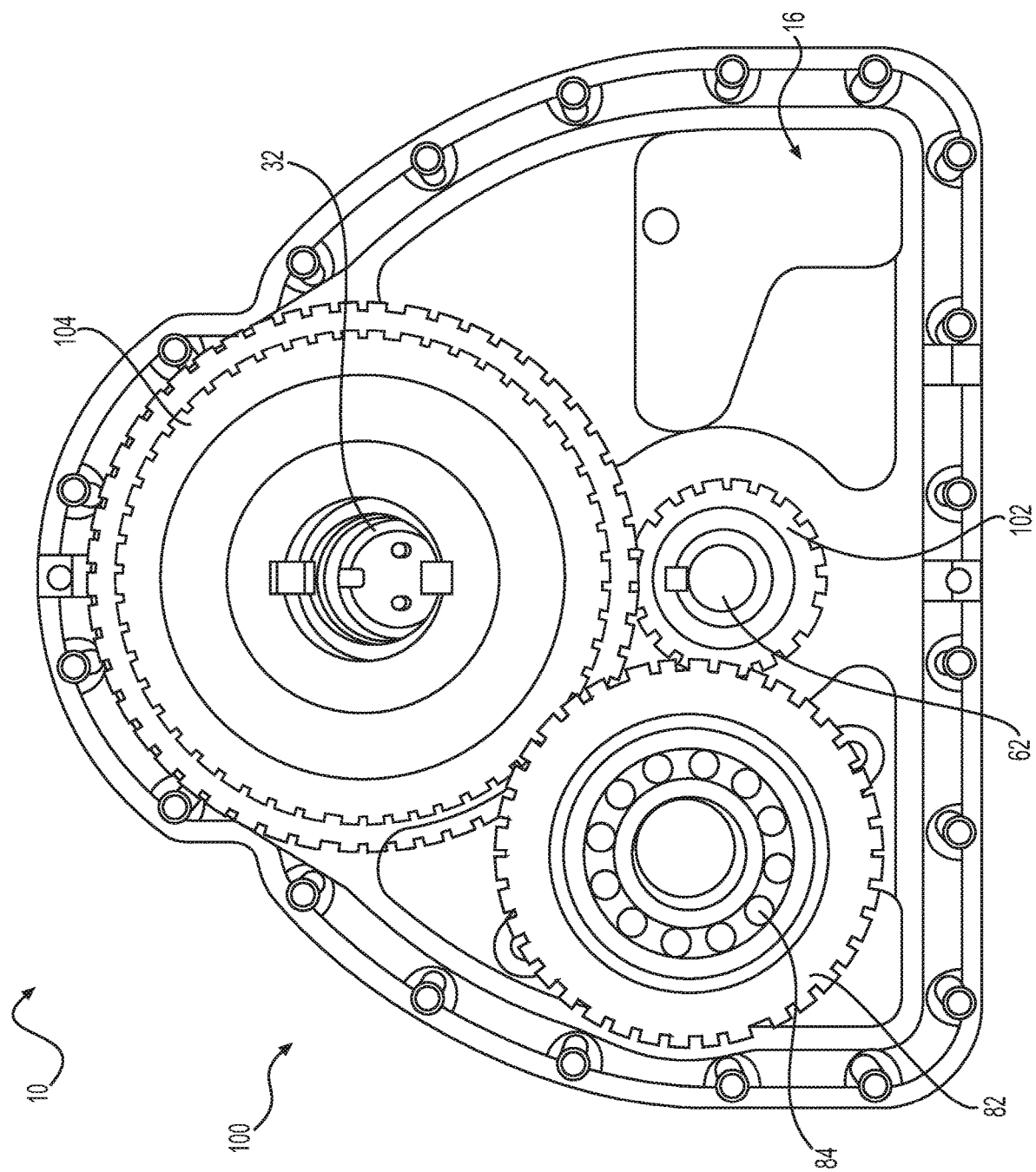
FIG. 13 is another sectional axial view of an improved airboat transmission assembly in accordance with one embodiment of the present innovation, illustrating a portion of the gear train assembly contained therein.
Figure 14:
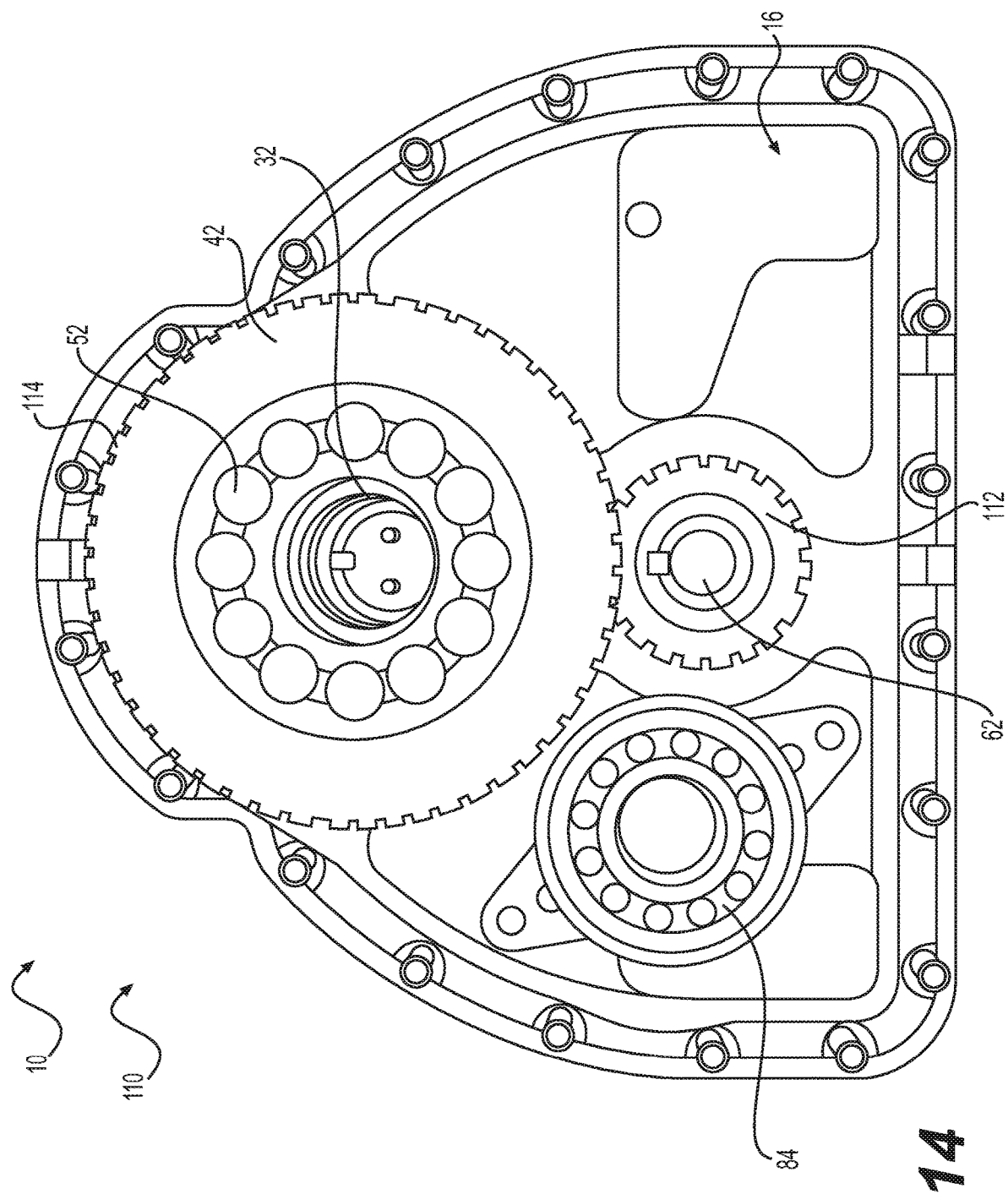
FIG. 14 is another sectional axial view of an improved airboat transmission assembly in accordance with one embodiment of the present innovation, illustrating a portion of the gear train assembly contained therein.
Figure 15:
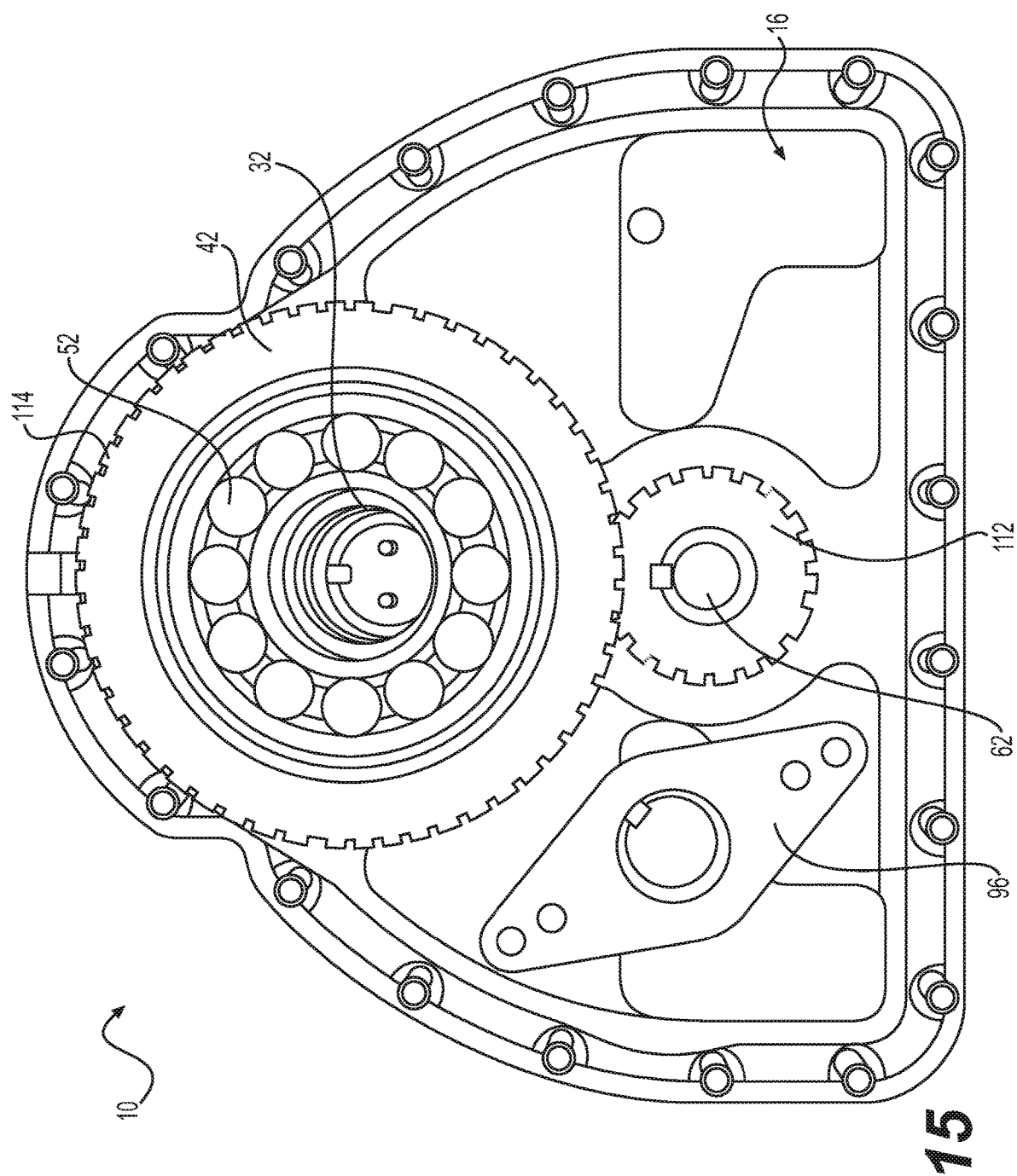
FIG. 15 is another sectional axial view of an improved airboat transmission assembly in accordance with one embodiment of the present innovation, illustrating a portion of the gear train assembly contained therein.
Figure 16:
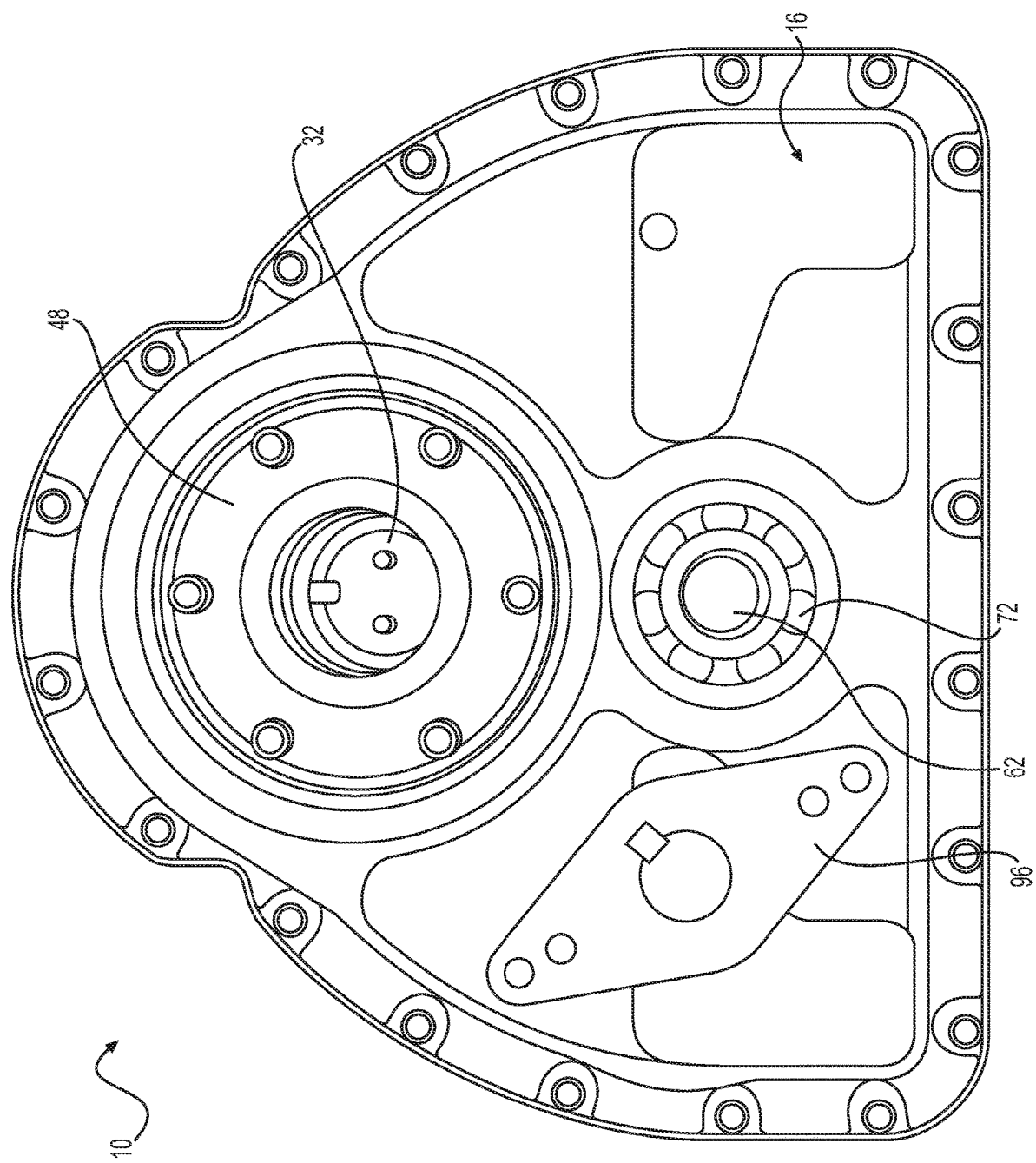
FIG. 16 is another sectional axial view of an improved airboat transmission assembly in accordance with one embodiment of the present innovation, illustrating a portion of the hollow drive shafts contained therein.
Figure 17:
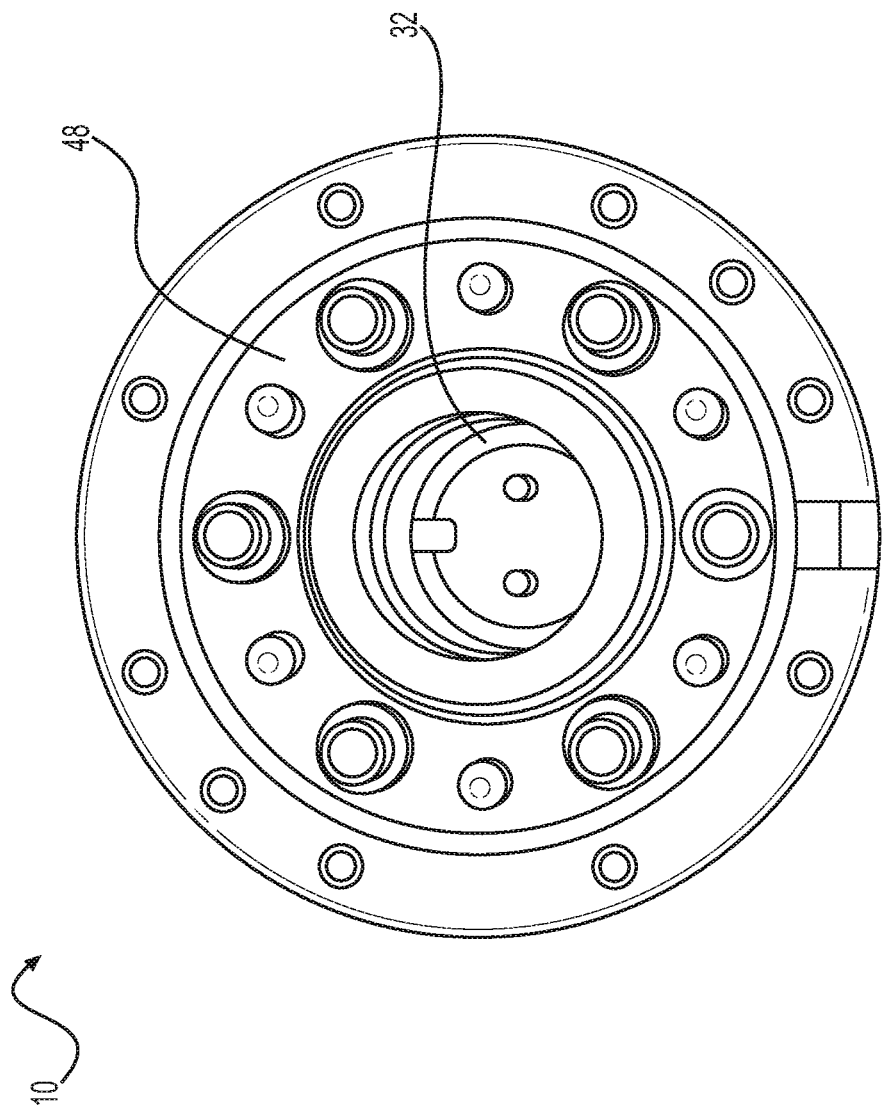
FIG. 17 is sectional axial view of an improved airboat transmission assembly in accordance with one embodiment of the present innovation, illustrating a portion of the gear train assembly contained therein.
Figure 18:
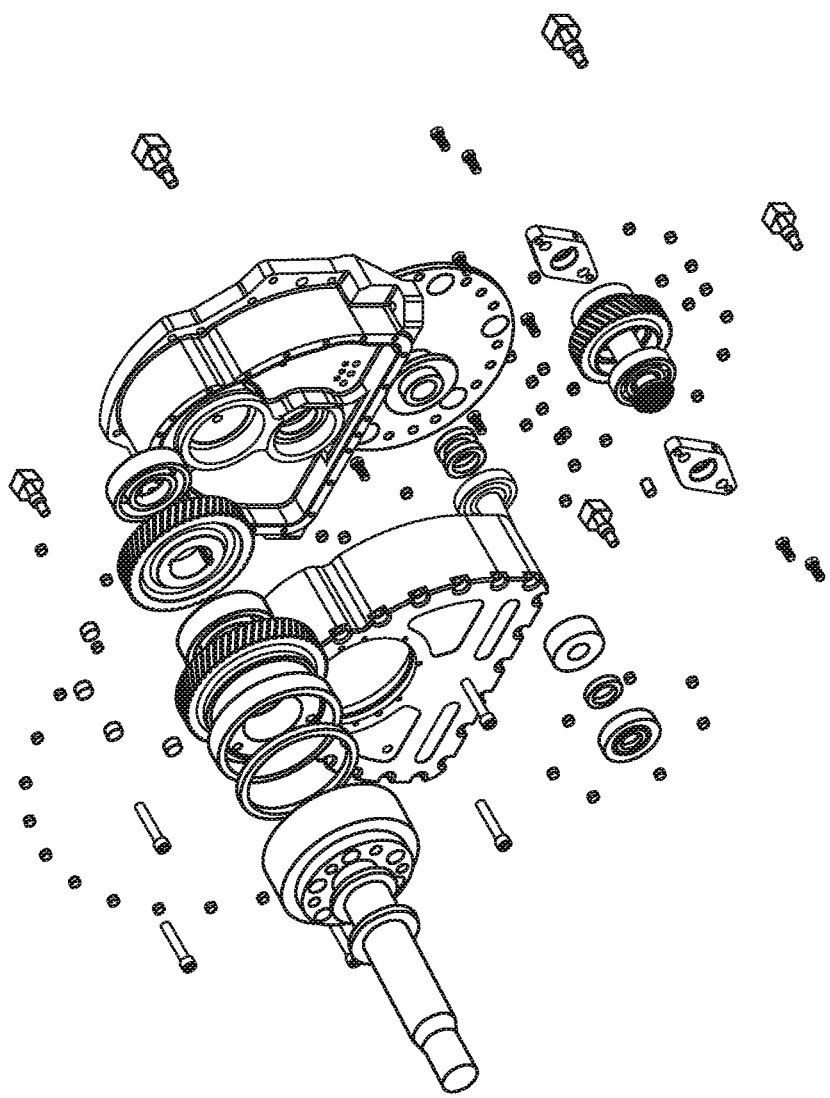
FIG. 18 is an exploded perspective view of an improved airboat transmission assembly of FIG. 1, illustrating the components contained therein.
Figure 18:
Figure 19:
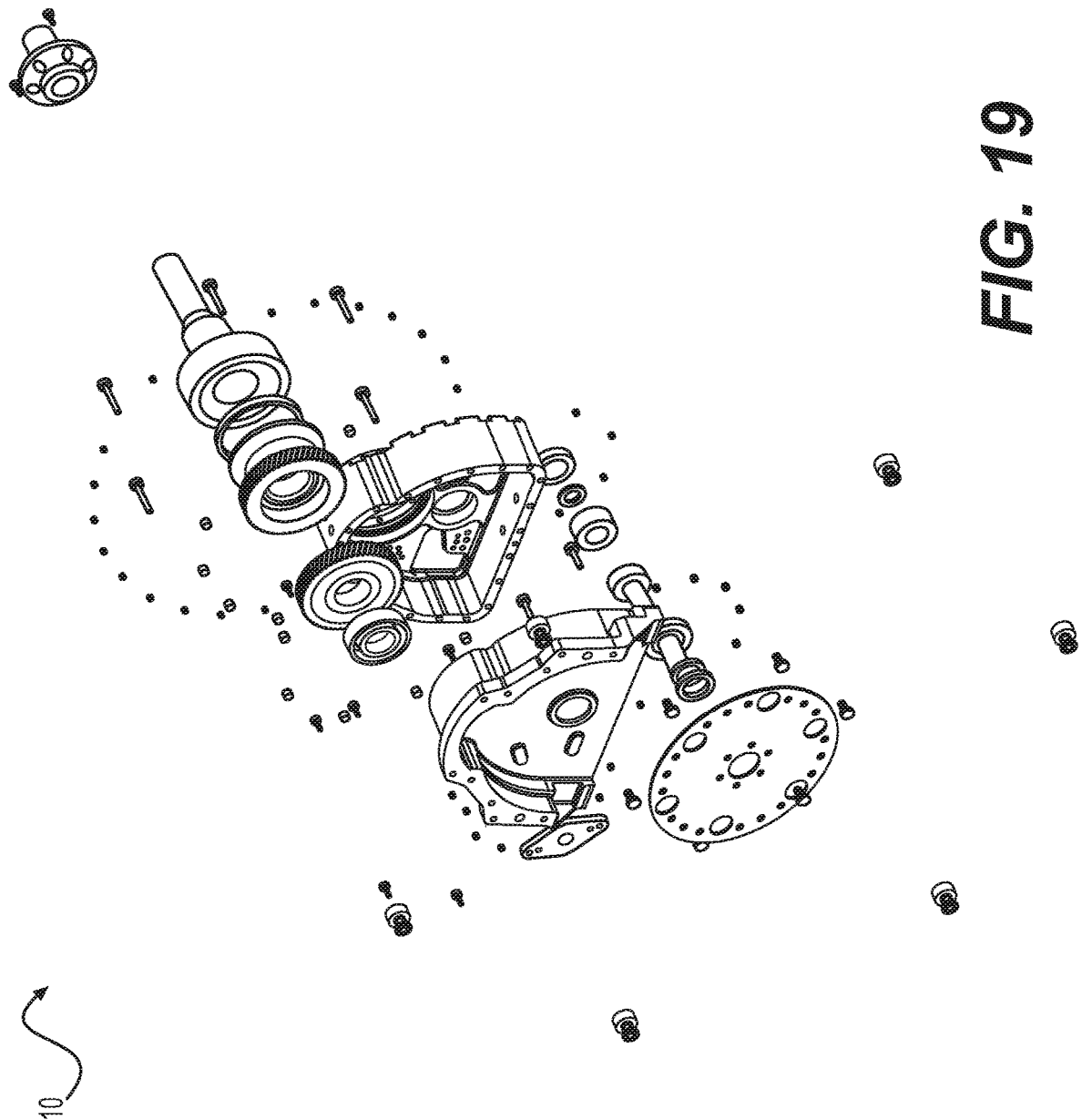
FIG. 19 is an exploded perspective view of an improved airboat transmission assembly of FIG. 2, illustrating the components contained therein.

Further, the outer driven shaft assembly 40 can be rotatably supportable via a fixed supporting means 56, which, as best illustrated in FIGS. 7 and 10, can comprise a bearing set rotatably affixed to a radially distal portion of the outer drive shaft assembly 40 and a fore portion of the outer case 14 in the interior space 16 of the transmission assembly 10. Additionally, an output shaft seal 58 can be situated aft of the fixed supporting means 56 and between the outer case 14 and the outer driven shaft assembly 40 to provide a continuous seal surrounding the outer driven shaft assembly 40. It will be appreciated that, although the output shaft seal 58 is depicted in FIGS. 7 and 10 as positioned in a surrounding, generally coaxial arrangement to the outer driven shaft 42, the output shaft seal 58 could be positioned in a surrounding, generally coaxial arrangement to the outer propeller drive hub.

Figure 4:
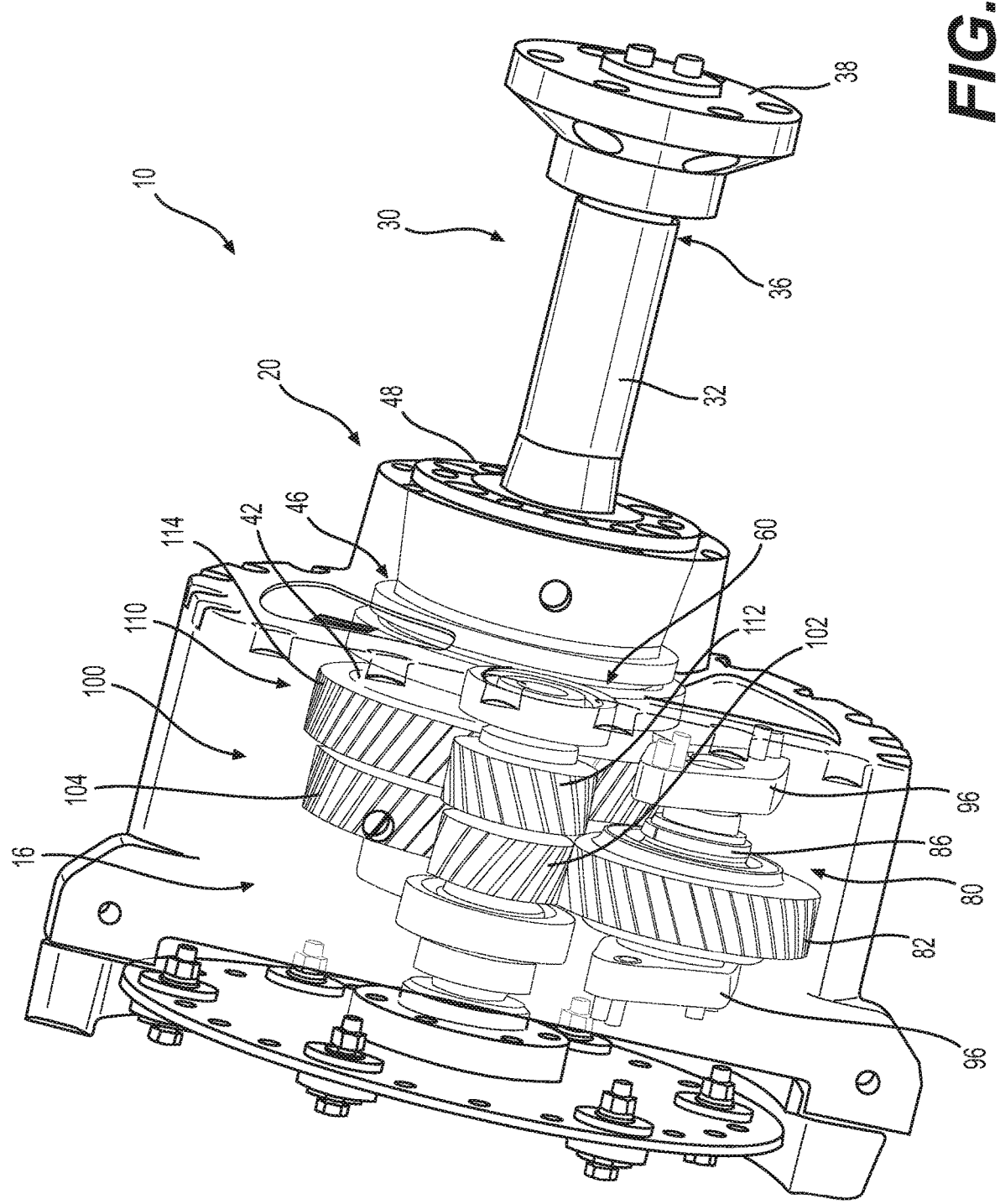
FIG. 4 is a side view of an improved airboat transmission assembly, wherein in the transmission housing is depicted as transparent to illustrate the gear train assembly in accordance with one embodiment of the present innovation.
Figure 5:
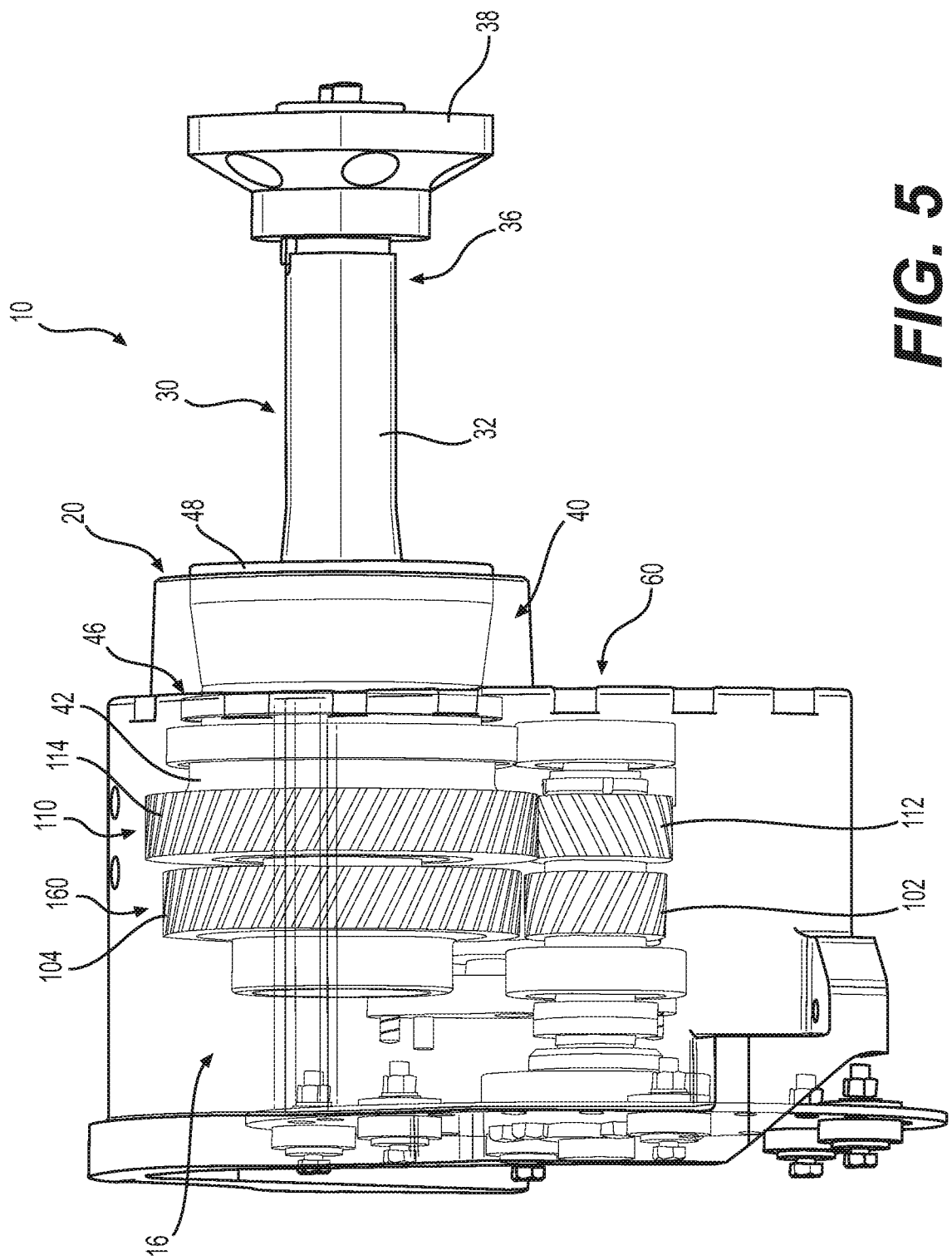
FIG. 5 is a side view of an improved airboat transmission assembly, wherein in the transmission housing is depicted as transparent to illustrate the gear train assembly in accordance with one embodiment of the present innovation.
Figure 6:
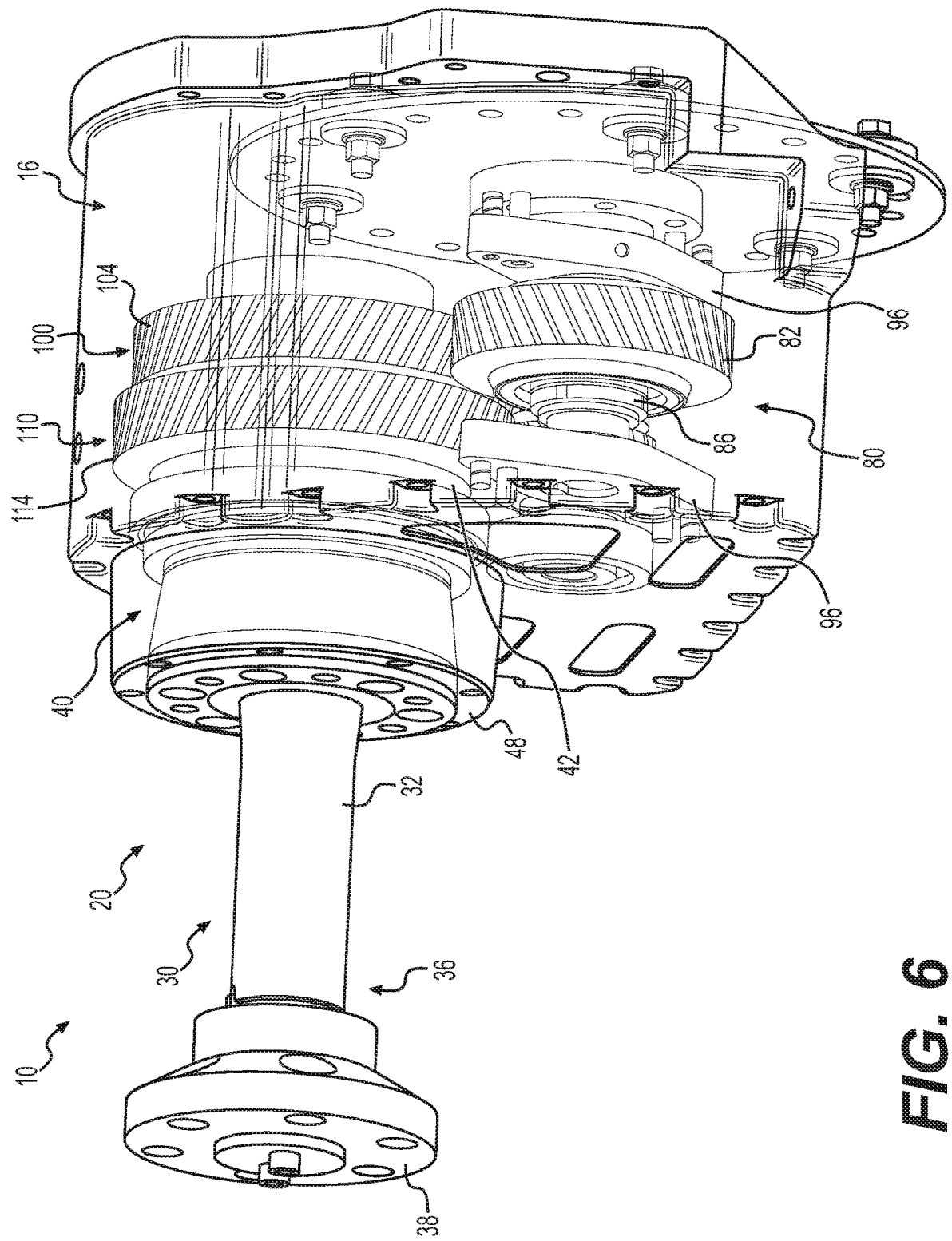
FIG. 6 is a side view of an improved airboat transmission assembly, wherein in the transmission housing is depicted as transparent to illustrate the gear train assembly in accordance with one embodiment of the present innovation.

As best illustrated in FIGS. 4 and 5, the input shaft assembly 60 generally extends into the interior space 16 of the gear-driven transmission assembly 10. The input shaft assembly 60 generally comprises an input shaft 62, with an aft end 64. The input shaft 62 is operably coupled with an engine (not shown) and is capable of rotating in either a left-hand direction or a right-hand direction. In a preferred embodiment, the input shaft 62 is rotatably supportable via a pair of coaxially aligned supporting means axially positioned in a spaced relation. These supporting means can include a fixed fore supporting means 70 and a fixed aft supporting means 72, wherein both the fixed fore supporting means 70 and the fixed aft supporting means 72 comprise a bearing set and bracket affixed, respectively, to a fore portion of the bellhousing 12 and an aft portion of the outer case 14 in the interior space 16 of the transmission assembly 10. Additionally, an input shaft seal 66 can be situated fore of the fixed fore supporting means 70 and between the bellhousing 12 and the input shaft 62 to provide a continuous seal surrounding the input shaft 62.

Figure 9:
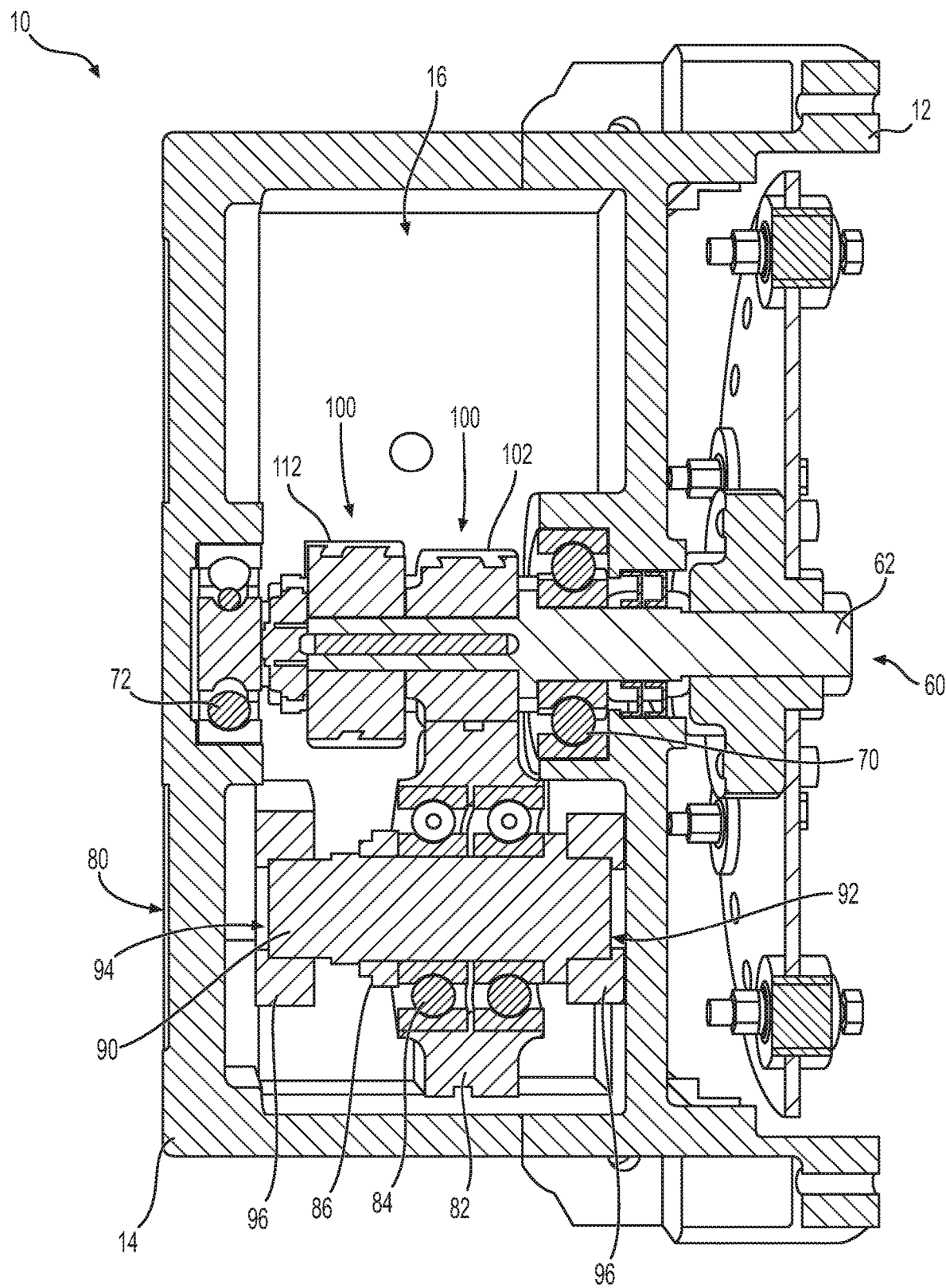
FIG. 9 is a sectional top view of an improved airboat transmission assembly in accordance with one embodiment of the present innovation.

The intermediate idler gear assembly 80 generally comprises an idler gear 82 an idler gear shaft 90, as best depicted in FIG. 9. The idler gear shaft 90 further comprises a fore end 92 and an aft end 94. In a preferred embodiment, the idler gear 82 is positioned in a surrounding, generally coaxial arrangement to the idler gear shaft 90 and is rotatably supportable via a bearing set 84. As further depicted in FIG. 9, the bearing set 84 can comprise a plurality of bearing sets, for example two bearing sets.

In one embodiment, the idler gear shaft 90 is affixed to the transmission assembly 10 via brackets 96, wherein the fore end 92 and the aft end 94 of the idler gear shaft 90 are attached to brackets 96 opposedly affixed, respectively, to an aft portion of the bellhousing 12 and a fore portion of the outer case 14. In this same embodiment, the idler gear 82 can freely rotate around the idler gear shaft 90 in either a right-hand or a left-hand direction and is maintained in a general axial position by spacers 86.

As depicted in FIGS. 3-6, in a preferred embodiment, the gear-driven transmission assembly 10 further comprises two gear systems, a first gear system 100 and a second gear system 110. The first gear system 100 generally comprises a first pinion gear 102, the intermediate idler gear 82, and a first driven gear 104. The first pinion gear 102 and the idler gear 82 are positioned and dimensioned so that the idler gear 82 is meshingly engaged and driven by the first pinion gear 102. The idler gear 82 and first driven gear 104 are positioned and dimensioned so that the first driven gear 104 is meshingly engaged and driven by the idler gear 82. In a preferred embodiment, the gear ratio between the first pinion gear 102 and the first driven gear 104 can range between 2.33:1 and 2.68:1. Further, in one embodiment, the first pinion gear 102 is coaxially affixed to the input shaft 62, by a key-keyway connection, as best illustrated in FIGS. 7 and 13-15, adjacent to a fore portion thereof. In the same embodiment, the first driven gear 104 is coaxially affixed to the inner driven shaft assembly 30, preferably the inner driven shaft 32.

The second gear system 110 generally comprises a second pinion gear 112 and a second driven gear 114. The second pinion gear 112 and the second driven gear 114 are positioned and dimensioned so that the second driven gear 114 is meshingly engaged and driven by the second pinion gear 112. In a preferred embodiment, the gear ratio between the second pinion gear 112 and the second driven gear 114 can range between 2.33:1 and 2.68:1. Further, the second pinion gear 112 is axially positioned in a spaced relation to the idler gear 82 and the first driven gear 104, and thus is not capable driving either the idler gear 82 or the first driven gear 104. Further, the second driven gear 114 is axially and radially positioned in a spaced relation to the first pinion gear 102, and thus is not capable of being driven by the first pinion gear 102. In one embodiment, the second pinion gear 112 is coaxially affixed to the input shaft 62, by a key-keyway connection, as best illustrated in FIGS. 7 and 13-15, adjacent to an aft portion thereof, such that the second pinion gear 112 is axially positioned in a spaced relation to the first pinion gear 102. For example, the first pinion gear 102 and the second pinion 112 can be axially spaced along the input shaft 62 so that there is approximately 6.35 mm of space between a face of the first pinion gear 102 and the opposing face of the second pinion 112. In the same embodiment, the second driven gear 114 is coaxially affixed to the outer driven shaft assembly 40, preferably the outer driven shaft 42.

In one embodiment, the second pinion gear 112 can be larger than the first pinion gear 102; for example, the second pinion gear 112 can be on the order of about 9% larger than the first pinion gear 102. However, it will be appreciated that the first pinion gear 102 and second pinion gear 112 can be any comparative size.

It will be appreciated that the gears used in the first gear system 100 and second gear system 110, although depicted as helical gears in the FIGS. 3-6, 18, and 19, may include any gear type, including, but not limited to, spur gears or herringbone gears. It will be further appreciated that the configurations and shapes of these gears are optimized for minimum volume and maximum stability, for example by limiting the necessary axial and radial offset distances of the gears and gear shafts comprising the gear-driven transmission assembly 10. The configuration and shapes of the gears, in turn, optimizes the load capacity, weight, and performance of the transmission assembly 10.

In a preferred embodiment, the input shaft 62 is driven in a first direction, which, in turn, drives the first pinion gear 102 and the second pinion gear 112 in the first direction. In the first gear system 100, the idler gear 82 is engaged and driven by the first pinion gear 102 in a second direction opposite of the first direction. Further, the first driven gear 104 is engaged and driven by the idler gear 82 in a third direction opposite of the second direction and the same as the first direction. In the second gear system 110, the second driven gear 114 is engaged and driven by the second pinion gear 112 in a second direction opposite of the first direction. As a result, the first driven gear 104 and the second driven gear 114 are counter-rotating in opposite directions relative to each other. It will be appreciated that the input shaft 62 is capable of being driven in a right-hand or left-hand direction and that the first gear system 100 and the second gear system 110 can be adapted to be driven by an input shaft 62 driven in a right-hand or left-hand direction so that the first driven gear 104 and the second driven gear 114 are driven in a counter-rotating manner.

As a result, the inner driven shaft assembly 30 is driven by the first driven gear 104 in the first direction, and the outer driven shaft assembly 40 is driven by the second driven gear 114 in the second direction. Consequently, the inner driven shaft assembly 30 and the outer driven shaft assembly 40 are counter-rotating. In one embodiment, the gear ratios within and/or between the first gear system 100 and the second gear system 110 could produce varying rotational velocities for the propellers (not shown) attached thereto.

It will be appreciated that the components of the gear-driven transmission assembly 10 disclosed herein may consist of billet aluminum or traditional cast metals, including nonferrous metals such as zinc, copper, and aluminum-based alloys.

As depicted in FIGS. 10-14, in a preferred embodiment, the longitudinal axes of the input shaft and the output shaft are positioned in substantially vertical alignment when the transmission 10 is substantially level.

From the accompanying materials, it will be seen that the innovation is one well adapted to attain all the ends and objects set forth herein with other advantages which are obvious and which are inherent to the structure. It will be understood that certain features and sub combinations are of utility and may be employed without reference to other features and sub combinations. This is contemplated by and is within the scope of the claims. Since many possible embodiments of the innovation may be made without departing from the scope thereof, it is also to be understood that all matters herein set forth or shown in the accompanying drawings and photographs are to be interpreted as illustrative and not limiting.

The constructions described in the accompanying materials and illustrated in the drawings and photographs are presented by way of example only and are not intended to limit the concepts and principles of the present innovation. As is evident from the description, certain aspects of the present innovation are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings and photographs. All such changes, modifications, variations and other uses and applications which do not depart from the spirit and scope of the innovation are deemed to be covered by the innovation which is limited only by the claims which follow.

What is claimed is:

1. A gear-driven transmission, with a transmission housing, comprising:
    a first driven gear coaxially affixed to an inner driven shaft;
    a second driven gear coaxially affixed to a propeller hub;
    an assembly of multiple gears rotatably fitted within the transmission housing and mechanically coupled with an engine drive shaft for driving the inner driven shaft and the propeller hub in a counter-rotating fashion;
    a floating fore bearing set rotatably and coaxially attached to the inner driven shaft; and
    a floating aft bearing set rotatably and coaxially attached to the inner driven shaft at a position aft of the floating fore bearing set;
    wherein the propeller hub is mounted to the gear-driven transmission; and
    wherein the inner driven shaft is mounted within the propeller hub and there is no dedicated oil or lubrication system for the floating fore bearing set or the floating aft bearing set.

2. The gear-driven transmission of claim 1, wherein the floating fore bearing set comprises ball bearings with a first width and the floating aft bearing set comprises ball bearings with a second width.

3. The gear-driven transmission of claim 2, wherein the first width is larger than the second width.

4. The gear-driven transmission of claim 3, wherein the ratio of the first width to the second width is 1.48:1.

5. The gear-driven transmission of claim 1, wherein the floating aft bearing set comprises a plurality of bearing sets.

6. The gear-driven transmission of claim 1, wherein the floating aft bearing set comprises a tapered bearing set.

7. The gear-driven transmission of claim 1, wherein the propeller hub is positioned in a coaxial arrangement relative to the floating fore bearing set and the floating aft bearing set.

8. The gear-driven transmission of claim 1, further comprising a fixed fore supporting means adapted to support the inner driven shaft.

* * * * *